April 8, 1930.  C. RIECKHOF  1,754,049
METHOD FOR DETERMINING THE ACTION OF
FORCES UPON STATIC CONSTRUCTIONS
Filed March 26, 1924
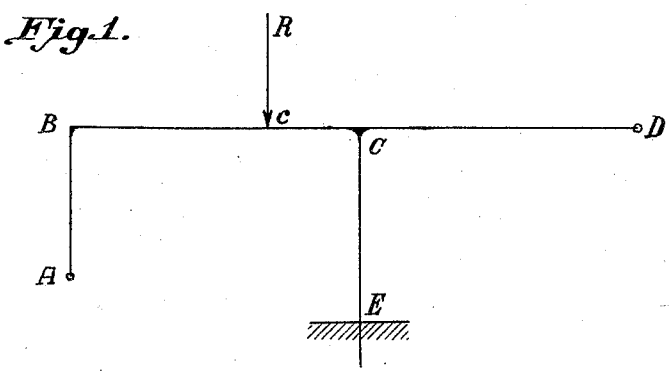
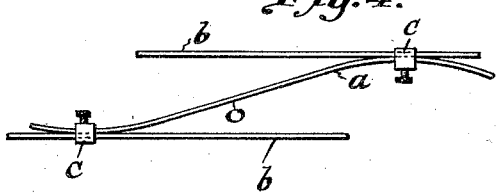
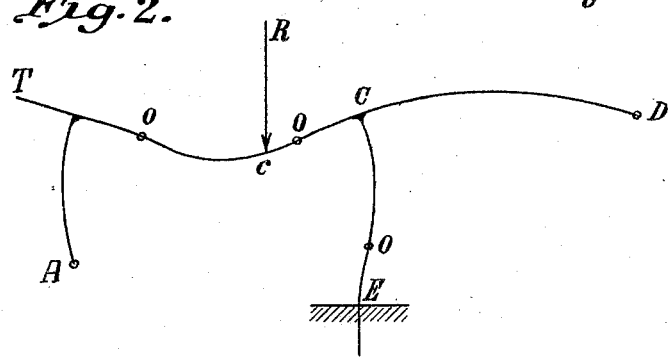
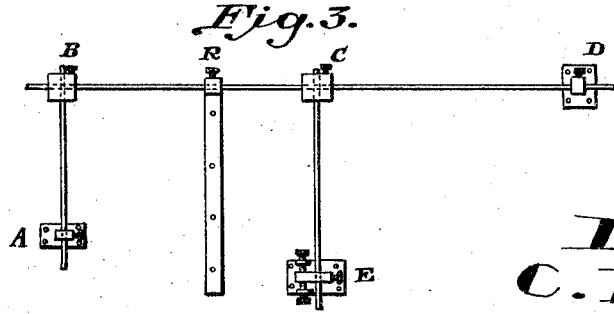
Inventor
C. Rieckhof
By Marks & Clerk
Attys.

Patented Apr. 8, 1930

1,754,049

UNITED STATES PATENT OFFICE

CHRISTIAN RIECKHOF, OF DARMSTADT, GERMANY

METHOD FOR DETERMINING THE ACTION OF FORCES UPON STATIC CONSTRUCTIONS

Application filed March 26, 1924, Serial No. 702,175, and in Germany March 29, 1923.

The invention relates to a method for permitting of the examination of the effect of various forces or weights upon static undetermined constructions, for instance, upon static indeterminable frames and trusses.

According to the invention the support to be investigated is made in a reduced form of rods of elastic material such as steel or other suitable material and the rods or parts forming the model are equivalent in their operation to the undetermined structure and possess equivalent shape, proportion of stiffness, fulcrum conditions and intersection point conditions but without consideration of the elasticity of the material used in the construction. This model is operated by placing a force of any desired dimension exactly at that point where the real load or a compensating load is to be applied to the trusses or frames which are being investigated.

The invention is illustrated in the accompanying drawings, in which:—

Fig. 1 is a diagrammatical side elevation of the arrangement for the forces applied thereto.

Fig. 2 is a similar view showing the position assumed by the parts when the force is applied.

Fig. 3 is a side elevation showing a mechanical structure of the model, and

Fig. 4 is a view of a modified model structure.

The rods or parts forming the frame are indicated in Figures 1 and 2 by system lines and in Figure 3 in a practical means and possess fulcrums of pivoting joints at A and D and rigid connections at B and C and a fulcrum of rigid fixation at E. As intimated the parts as shown in Figures 1 and 3 are in an unloaded or undeformed state, but when a force is applied to this model as indicated in Figure 2, it may be so strong, that an unmistakable deformation is visible. When in the deformation state the turning points $o$ as indicated in Figure 2 must be determined. The determination of the turning points is made by measuring the bow or bend of the bars forming the model by an instrument such as used for measuring the curvature of lenses.

In Figure 4 is exhibited another manner a means for determining the turning points. On the bent rod $a$ are fixed two tangent indicators $b$ of such a kind, that the two tangent indicators $b$ are showing parallel. Then the bissector pointed between the two contact points $c$ is the turning point $o$ of the bent rod.

The above mentioned result may also be attained by producing a graphic copy of the deformed model of the trusses or frames.

The result of the method carried out is that in each case the copy represents the position assumed by the static undetermined constructions with the designated turning or inflection points.

Because the turning points are identical with the moment zero points formed through the effect of any force and because its position is only dependent of the position of the applied force and is independent of the amount of force and the modulus of elasticity it results that a static undetermined system is converted into several static determined systems.

The moment zero points have the same action or effect as hinges and thereby subdivide the statically indeterminate structure into a number of statically determinate structural parts. As the position of the points of zero moments is independent of the magnitude of the applied force, any desired force may be applied which does not require measurement and can even remain unknown.

As the deformation is on a scale which is visible to the naked eye, a clear picture of the functioning of the whole system results. The direction of the moments and the shearing forces and reaction or support pressures can be ascertained directly in a clear and unmistakable manner from the nature of the bending or displacement. In the composition of the copy of the structure nothing is altered.

It is believed in view of the foregoing that a further detailed description of the operation of the invention is entirely unnecessary. Likewise it is believed that the advantages of the invention will be readily apparent.

Having thus fully described the invention what is claimed as new and desired to be secured by Letters Patent is:—

1. The method of investigating the operation of forces on a statically undetermined support comprising resolving said support into a plurality of statically simpler structural parts which are equivalent in their operation to the undetermined structure by forming a model of said support in reduced scale out of elastic material of equivalent shape, proportion of stiffness, fulcrum conditions and intersection point conditions and bending said model by a force of any dimension and then determining by means of this bent condition the turning points of the bent model.

2. The method of investigating the operation of forces on a statically undetermined support comprising resolving said support into a plurality of statically simpler structural parts which are equivalent in their operation to the undetermined structure by forming a model of said support in reduced scale out of steel of equivalent shape, proportion of stiffness, fulcrum conditions and intersection point conditions and bending said model by a force of any dimension and then determining by means of this bent condition the turning points of the bent model.

3. The method of investigating the operation of forces on a statically undetermined support comprising resolving said support into a plurality of statically simpler structural parts which are equivalent in their operation to the undetermined structure by forming a model of said support in reduced scale out of elastic material of equivalent shape, proportion of stiffness, fulcrum conditions and intersection point conditions and bending said model by a force of any dimension and determining the turning points of the bent model by applying an instrument which is usual for measuring the degree of the curvature.

4. The method of investigating the operation of forces on a statically undetermined support comprising resolving said support into a plurality of statically simpler structural parts which are equivalent in their operation to the undetermined structure by forming a model of said support in reduced scale out of elastic material of equivalent shape, proportion of stiffness, fulcrum conditions and intersection point conditions and bending said model by a force of any dimension and applying two tangent indicators to the bent portions of a model to determine the turning points thereof.

5. The method of investigating the operation of forces on a statically undetermined support comprising resolving said support into a plurality of statically simpler structural parts which are equivalent in their operation to the undetermined structure by forming a model of said support in reduced scale out of elastic material of equivalent shape, proportion of stiffness, fulcrum conditions and intersection point conditions and bending said model by a force of any dimension whereupon the model in its deformated state is copied graphically and the determination of the turning points is effected on this graphic copy.

In testimony whereof I affix my signature.

CHRISTIAN RIECKHOF.